United States Patent
Endruschat et al.

(10) Patent No.: US 8,753,999 B2
(45) Date of Patent: Jun. 17, 2014

(54) OXIDATION CATALYST

(75) Inventors: Uwe Endruschat, Frankfurt (DE); Ansgar Wille, Hanau-Mittelbuchen (DE); Prasanna Rajagopalan, Rostock (DE)

(73) Assignee: Heraeus Precious Metals GmbH & Co. KG, Hanau (DE)

( * ) Notice: Subject to any disclaimer, the term of this patent is extended or adjusted under 35 U.S.C. 154(b) by 585 days.

(21) Appl. No.: 12/499,442

(22) Filed: Jul. 8, 2009

(65) Prior Publication Data

US 2010/0047143 A1 Feb. 25, 2010

(30) Foreign Application Priority Data

Jul. 9, 2008 (DE) .................. 10 2008 032 200

(51) Int. Cl.
- *B01J 23/00* (2006.01)
- *B01J 23/10* (2006.01)
- *C01G 37/14* (2006.01)
- *C01G 23/00* (2006.01)

(52) U.S. Cl.
USPC ........... 502/304; 502/309; 502/319; 502/350; 423/595; 423/598

(58) Field of Classification Search
CPC .. C01F 17/0018; C01F 37/006; C01F 55/002; C01G 23/003; B01J 23/26; B01J 23/10; B01J 23/63; B01J 23/6522; B01J 23/685; B01J 2523/00; B01J 2523/3712; B01J 2527/47; B01J 2523/67; B01J 23/002
USPC ......... 502/304, 305, 308, 309, 319, 349, 350; 423/592.1, 595, 598
See application file for complete search history.

(56) References Cited

U.S. PATENT DOCUMENTS 4,925,980 A * 5/1990 Matsumoto et al. .......... 562/534
5,380,692 A * 1/1995 Nakatsuji et al. ............. 502/303

(Continued)

FOREIGN PATENT DOCUMENTS

| DE | 103 42 162 A1 | 4/2005 |
|---|---|---|
| WO | 01/70631 A1 | 9/2001 |
| WO | 03/051493 A2 | 6/2003 |

OTHER PUBLICATIONS

Dulamita, Nicu et al.; "Ethylbenzene dehydrogenation on Fe2—O3—Cr2O3—K2CO3 catalysts promoted with transitional metal oxides"; A: General; vol. 287 pp. 9-18; (2005).

(Continued)

*Primary Examiner* — Anthony J Zimmer
(74) *Attorney, Agent, or Firm* — Panitch Schwarze Belisario & Nadel LLP

(57) ABSTRACT

A catalyst for selective oxidation of hydrocarbons relative to carbon monoxide includes a mixed oxide based on the compound $Ce_{0.1-0.5}Ti_{0.2-0.8}Cr_{0.1-0.5}O_x$, wherein x is (the total of the valences of the metals)/2. Preferably, the mixed oxide is fixed as a coating on a molded body or less than 0.5 wt. % precious metal is doped to the mixed oxide. Oxidizable exhaust-gas components are oxidized for exhaust-gas purification by a mixed oxide based on the compound $Ce_{0.1-0.5}Ti_{0.2-0.8}Cr_{0.1-0.5}O_x$ as the catalyst. Preferably, hydrocarbons are preferentially oxidized relative to carbon monoxides or nitrogen oxides. For producing an oxidation catalyst for internal combustion engines, a mixed oxide made of cerium oxide, titanium oxide, chromium oxide, and optionally other metal oxides is fixed to a metallic or oxide or carbide, high temperature-stable molded body or an oxide ceramic, wherein the oxide ceramic is fixed to a molded body. Preferably, here the molded body is a wire mesh or a honeycomb structure, or the oxide ceramic on which the mixed oxide is fixed is a wash coat. Within a combustion chamber and an exhaust-gas pipe or exhaust-gas return pipe connected to this combustion chamber, a mixed oxide is fixed based on cerium oxide, titanium oxide, and chromium oxide as an oxidation catalyst.

2 Claims, 3 Drawing Sheets

(56) References Cited

U.S. PATENT DOCUMENTS

| | | |
|---|---|---|
| 2002/0006374 A1* | 1/2002 | Kourtakis et al. .......... 423/418.2 |
| 2002/0009406 A1 | 1/2002 | Kourtakis et al. |
| 2003/0097034 A1* | 5/2003 | Liu ............................... 585/654 |
| 2009/0283419 A1* | 11/2009 | Del-Gallo et al. ............ 205/628 |

OTHER PUBLICATIONS

Office Action issued Jul. 26, 2013 in DE Application No. 10 2008 032 200.8.

* cited by examiner

OXIDATION CATALYST

BACKGROUND OF THE INVENTION

The present invention relates to catalysts for oxidizing exhaust-gas components at temperatures between 200 and 1000° C., which catalysts preferentially oxidize hydrocarbons before carbon monoxide.

Precious metal catalysts containing 0.1 to 5 wt. % precious metal, based on the oxide carrier mass, exhibit a good to very good oxidation effect at temperatures above 200° C., particularly above 300° C. The stability of such systems with respect to high temperatures, particularly above 850° C., is improved by higher precious metal loads.

Mixed oxide catalysts, which completely eliminate precious metal additives, can exhibit sufficient oxidation activity at low volume velocities. In general, the response temperatures for the catalytic activity lie in part significantly above those of precious metal catalysts. The stability with respect to high temperatures is generally poorer than in precious metal catalysts. In addition, non-precious metal catalysts react rather selectively with carbon monoxide and are less suitable for the combustion of hydrocarbons.

BRIEF SUMMARY OF THE INVENTION

Objects of the present invention comprise providing a catalyst that has either no or only a small precious metal content, that is stable at high temperatures and that oxidizes hydrocarbons selectively.

To achieve these objects according to the invention, mixed oxides are provided based on the oxides of the elements cerium, titanium, and chromium, preferably on a ceramic carrier material. Preferably, the mixed oxides are precipitated on the ceramic carrier, particularly aluminum oxide. In an inventive embodiment, a subsequent addition of precious metal, preferably palladium, is carried out in a quantity of less than 0.05 wt. %, preferably less than 0.02 wt. %. According to the invention, for a doping with palladium, catalytic results can be achieved like those that could be achieved in the prior art only with precious metal loads of 1 to 5 wt. %.

According to the invention, the oxidation of the hydrocarbons is carried out at temperatures greater than 400° C., preferably greater than 500° C., with a mixed oxide of the elements cerium, titanium, and chromium. This catalytic mixed oxide can be easily fixed to a carrier, for example to a typical metallic honeycomb. Preferably, the mixed oxide is fixed to a ceramic carrier, such as aluminum oxide, and this composite of the mixed oxide and the ceramic carrier material is fixed as a wash coat to a typical carrier, such as a metallic honeycomb.

Preferably, titanium oxide is the main component of the mixed oxide catalyst, preferably in an amount of 40 to 60 wt. %. Each of the three metal-oxide components of the mixed oxide catalyst amounts to at least 10 wt. %, preferably 15 wt. %, wherein the content of cerium preferably equals from 10 to 30 wt. %, preferably 15 to 25 wt. %, and the portion of chromium oxide preferably equals between 20 and 40 wt. %, preferably 25 to 35 wt. %. A ratio of Ce to Ti to Cr of 2-5-3 with a tolerance of 20%, preferably of 10%, has proven particularly effective.

The mixed oxide made of cerium oxide, titanium oxide, and chromium oxide tolerates other metal oxides, whose metal is selected from the group comprising Mg, Ca, Sr, Ba, Al, Ga, In, Sn, transition elements up to and including atomic number 79 except Tc and Cd, and lanthanides except Pm. The general formula for the mixed oxide reads: $Ce_{0.1-0.5}Ti_{0.2-0.8}Cr_{0.1-0.5}Me_{0.0-0.2}O_x$, preferably $Ce_{0.2-0.5}Ti_{0.3-0.7}Cr_{0.2-0.5}Me_{0.0-0.1}O_x$, wherein x is (the total of the valences of the metals)/2.

This non precious metal catalyst is suitable for the selective oxidation of hydrocarbons in exhaust gases having temperatures between 300° C. and 1000° C. for the preferred oxidation of hydrocarbons relative to carbon monoxide. For temperatures of use greater than 700° C., particularly greater than 850° C., the temperature stability is better than for many precious metal catalysts.

According to one embodiment of the invention, the catalyst for the selective oxidation of hydrocarbon relative to carbon monoxide is a mixed oxide based on $CeO_2$, $TiO_2$, and $Cr_2O_3$. This allows exhaust-gas cleansing, in which oxidizable exhaust-gas components are oxidized by a mixed oxide as a catalyst. In particular, hydrocarbons are preferentially oxidized relative to carbon monoxide. In principle, the oxidation catalyst based on the CeTiCr mixed oxide is suitable for all processes in which a total oxidation is required, as, for example, the cleaning of industrial exhaust gases or the application as a diesel oxidation catalyst. The catalyst formulation based on a CeTiCr mixed oxide is particularly suitable for use in small motor applications for reducing their HC emissions.

In order to lower the minimum temperature for the catalytic effect, preferably to temperatures less than 400° C., the mixed oxide catalyst is additionally doped with precious metal, preferably palladium or silver. The precious metal portion is drastically reduced in comparison with previous Pt/Rh catalysts for the temperature range below 400° C. for the same effectiveness. Here, Pt and Rh can be replaced by other precious metals, preferably Ag, Pd, and Ir. Preferably, the use of precious metal is reduced here in comparison with the prior art by at least one order of magnitude. While known precious metal catalysts have 1 to 5 wt. % precious metal relative to the carrier material, preferably for the expensive precious metals Pt and Rh, less than 0.5 wt. %, preferably less than 0.2 wt. % precious metal, is sufficient according to the invention, because 0.005 wt. % precious metal is already sufficient according to the invention to achieve results that can be achieved with conventional catalysts based on precious metals. Here, according to the invention, less than 0.5 wt. %, preferably less than 0.2 wt. % of the inexpensive precious metals Au, Ru, Ir, and preferably, Pd and Ag, is sufficient.

According to the invention, comparable catalytic activities are achieved with substantially lower use of precious metal in comparison with precious metal catalysts, and a better stability relative to high temperatures is achieved. Furthermore, for the first time a mixed oxide catalyst is provided having a high selectivity relative to hydrocarbons. Preferably, precious metal is doped to the mixed oxide if the catalytic effect is to be carried out already at 200 to 300° C.

According to the invention, furthermore a particularly simple production is allowed. For the production of an oxidation catalyst for internal combustion engines, a mixed oxide made of cerium(IV) oxide, titanium(IV) oxide, and chromium (III) oxide is fixed to a molded body or an oxide ceramic. For this purpose, it has proven effective to impregnate the molded body with an aqueous solution of the mixed oxide and to dry the molded body impregnated with the mixed oxide. It has also proven effective to precipitate the mixed oxide on the molded body. The molded body is made of high temperature-stable material, preferably metal or and oxide or a carbide. Preferably, the molded body is a honeycomb structure or a wire mesh. Particularly preferred, the mixed oxide is fixed to an oxide ceramic, wherein the oxide ceramic is fixed to a molded body. Such oxide ceramics are also designated as wash coats. Optionally, the mixed oxide contains additional metal oxides, whose metal is selected from the group composed of Mg, Ca, Sr, Ba, Al, Ga, In, Sn, transition elements up to and including atomic number 79, except Tc and Cd, and lanthanides except Pm. Preferably, $CeO_2$, $TiO_2$, and $Cr_2O_3$ are the main components of the mixed oxide, and the other metal oxides are secondary components or dopants.

The mixed oxide is suitable as an oxidation catalyst in combustion chambers, preferably internal combustion engines for the complete combustion of fuel. In exhaust-gas pipes or exhaust-gas return pipes, hydrocarbons are oxidized by the oxidation catalyst. According to the invention, a device is also provided comprising a combustion chamber and an exhaust-gas pipe or exhaust-gas return pipe connected thereto, wherein inside the device, the mixed oxide based on cerium oxide, titanium oxide, and chromium oxide is fixed as an oxidation catalyst.

Preferably, in this device, the atomic percentages of the metals equal:
0.1 to 0.5 Ce, preferably 0.2 to 0.5,
0.2 to 0.8 Ti, preferably 0.3 to 0.7,
0.1-0.5 Cr, preferably 0.2 to 0.5,
wherein the mixed oxide optionally contains another metal oxide, whose metal is selected from the group composed of Mg, Ca, Sr, Ba, Al, Ga, In, Sn, transition elements up to and including atomic number 79 except Tc and Cd, and lanthanides except Pm, wherein the atomic percentages of the additional metals equal, in total, 0 to 0.2, preferably 0 to 0.1.

The selection of the ceramic carrier affects the activity, the temperature stability, and also the ability to coat the oxidation catalyst on metallic, ceramic, or carbide molded bodies.

Through the use of catalytically inert $Al_2O_3$, preferably the coatability and the thermal stability are improved. In this case, the basic surface of the $Al_2O_3$ allows improved binding to the oxide surfaces of the molded bodies and offers a temperature-stable carrier framework for the mixed oxide.

Through the use of a catalytically active carrier, such as $CeO_2$, the oxidation activity is preferably improved.

Through the use of a catalytically inert carrier, such as $Al_2O_3$, and a catalytically active carrier, such as $CeO_2$, the coatability, bonding behavior, temperature stability, and also oxidation capacity could be increased.

Fixing the mixed oxide catalyst on a ceramic carrier is carried out at a ratio of mixed oxide to carrier of 5:1 to 1:3, preferably at a ratio of 3:1 to 1:1. Preferably, a ratio of 7:3 to 6:4 has been shown to be particularly active.

Likewise, for supporting the oxidation activity of precious metal catalysts, the mixed oxide can be used in physical mixtures together with precious metal catalysts, in order to reduce the use of precious metal.

A non precious metal catalyst in this respect for the selective oxidation of hydrocarbon is particularly suitable for small motor exhaust gases having temperatures greater than 850° C. for the preferred oxidation of hydrocarbons relative to carbon monoxide. With amounts of only 0.01 to 0.05 wt. % precious metal, preferably Pd, doped to the mixed oxide, an oxidation catalyst is provided, which is already active below 300° C.

The use of a mixed oxide based on cerium oxide, titanium oxide, and chromium oxide as an oxidation catalyst within a combustion chamber or an exhaust gas pipe or an exhaust gas return pipe spares the previously used precious metal, particularly when the atomic percentages of the metals equal:
0.1 to 0.5 Ce, preferably 0.2 to 0.4,
0.2 to 0.8 Ti, preferably 0.3 to 0.7,
0.1 to 0.5 Cr, preferably 0.2 to 0.4,
wherein the mixed oxide optionally contains an additional metal oxide, whose metal is selected from the group composed of Mg, Ca, Sr, Ba, Al, Ga, In, Sn, transition elements up to and including atomic number 79 except Tc and Cd, and lanthanides except Pm, wherein the atomic percentages of the other metals equal, in total, 0 to 0.2.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

An exhaust gas composition comprising 6 vol. % CO, 8.7 vol. % $CO_2$, 4.5 vol. % $O_2$, 1.1 vol. % HC (hydrocarbons), and the remainder $N_2$ at a space velocity of 100,000 $m^3/m^3 \cdot hr$ is treated with the catalysts described in Examples 1 to 3.

EXAMPLE 1

Ce—Ti—Cr Oxide in a Ratio of 20-50-30

230.9 g Cr(III) nitrate is dissolved in 300 ml deionized water (pH=0.94). 102.4 g Ce nitrate solution (19.5% Ce) and 521.6 g titanium oxide sulfate solution are weighed out, and the titanium oxide sulfate solution is added to the Cr nitrate solution. Then, the Ce nitrate solution is added. 600 ml of 12.5% $NH_3$ solution is provided in a vessel, and the Ce—Ti—Cr solution is slowly dripped into the $NH_3$ solution. During the addition, the pH value is held at >7 with additional $NH_3$ solution. The precipitated CeTiCr oxide is filtered and washed sulfate free. The resulting powder is dried at 110° C. and heated 4 hours at 500° C. Finally, the powder is ground to form a coatable wash-coat slurry. For testing the catalytic activity, metal honeycomb is coated with a 200 g/l coating quantity and tested in a synthesis gas apparatus.

Figure 1:
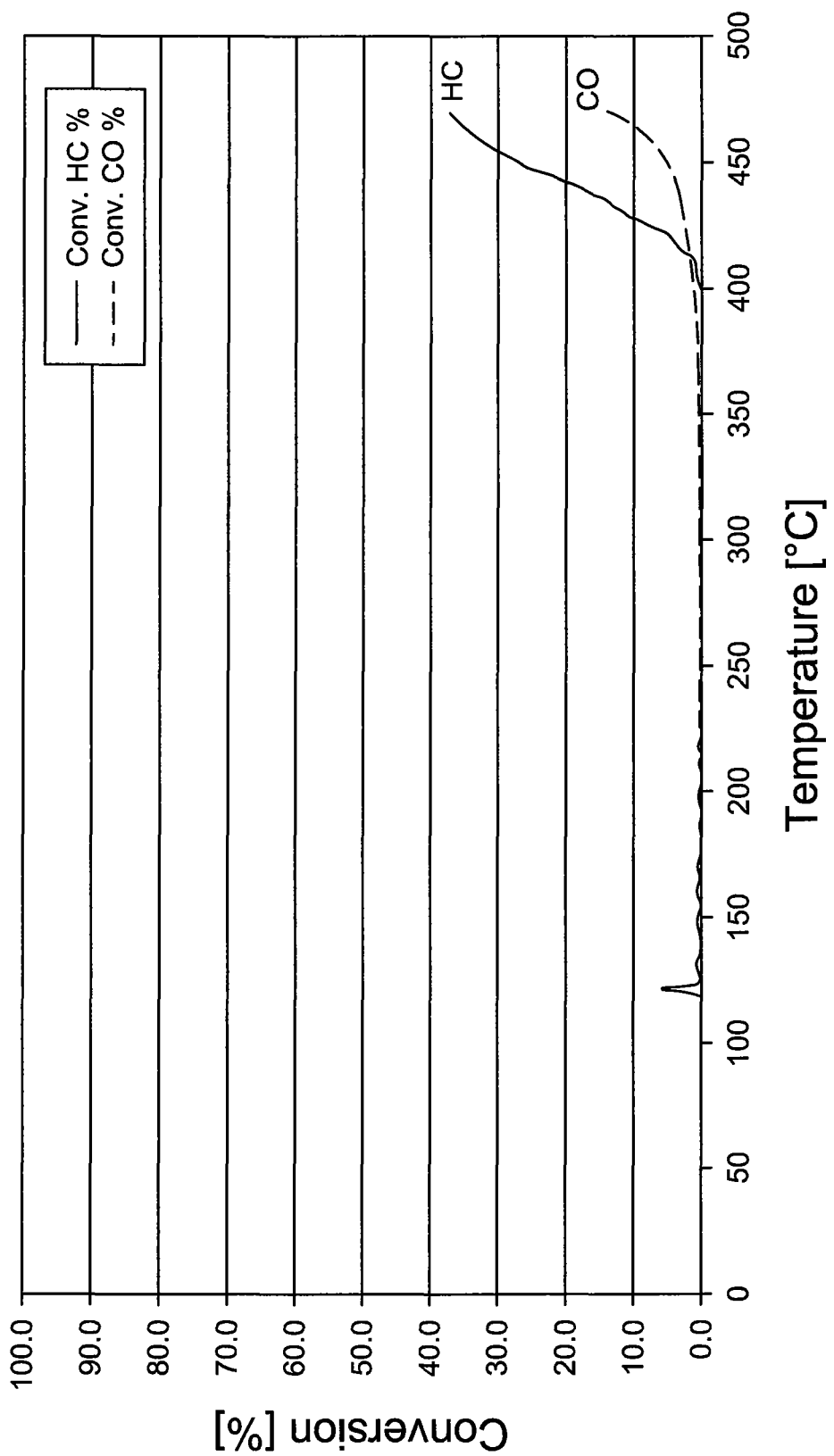
FIG. 1 is a graph showing the conversion of hydrocarbons and carbon monoxide in the presence of a mixed oxide catalyst according to an embodiment of the invention.

The temperature-dependent conversion rates of hydrocarbons and carbon monoxide are reproduced in FIG. 1.

EXAMPLE 2

$Al_2O_3$Ce—Ti—Cr Oxide in Ratio 40% $Al_2O_3$ and 60% CeTiCr Oxide in Ratio 20-50-30

According to Example 1, a precipitation reagent is produced from Ce nitrate solution, titanium oxide sulfate solution, and Cr(III) nitrate solution. A commercial gamma $Al_2O_3$ is suspended in water and set to pH 8 to 9 with $NH_3$ solution. The Ce—Ti—Cr solution is now dripped slowly while controlling the pH value (>7). The Ce—Ti—Cr oxide precipitated onto the $Al_2O_3$ is filtered, washed sulfate free, dried, and tempered. Then the powder is ground to form a coatable wash-coat slurry. For testing the catalytic activity, metal honeycombs are coated with a 200 g/l coating quantity and tested in a synthesis gas apparatus.

Figure 2:
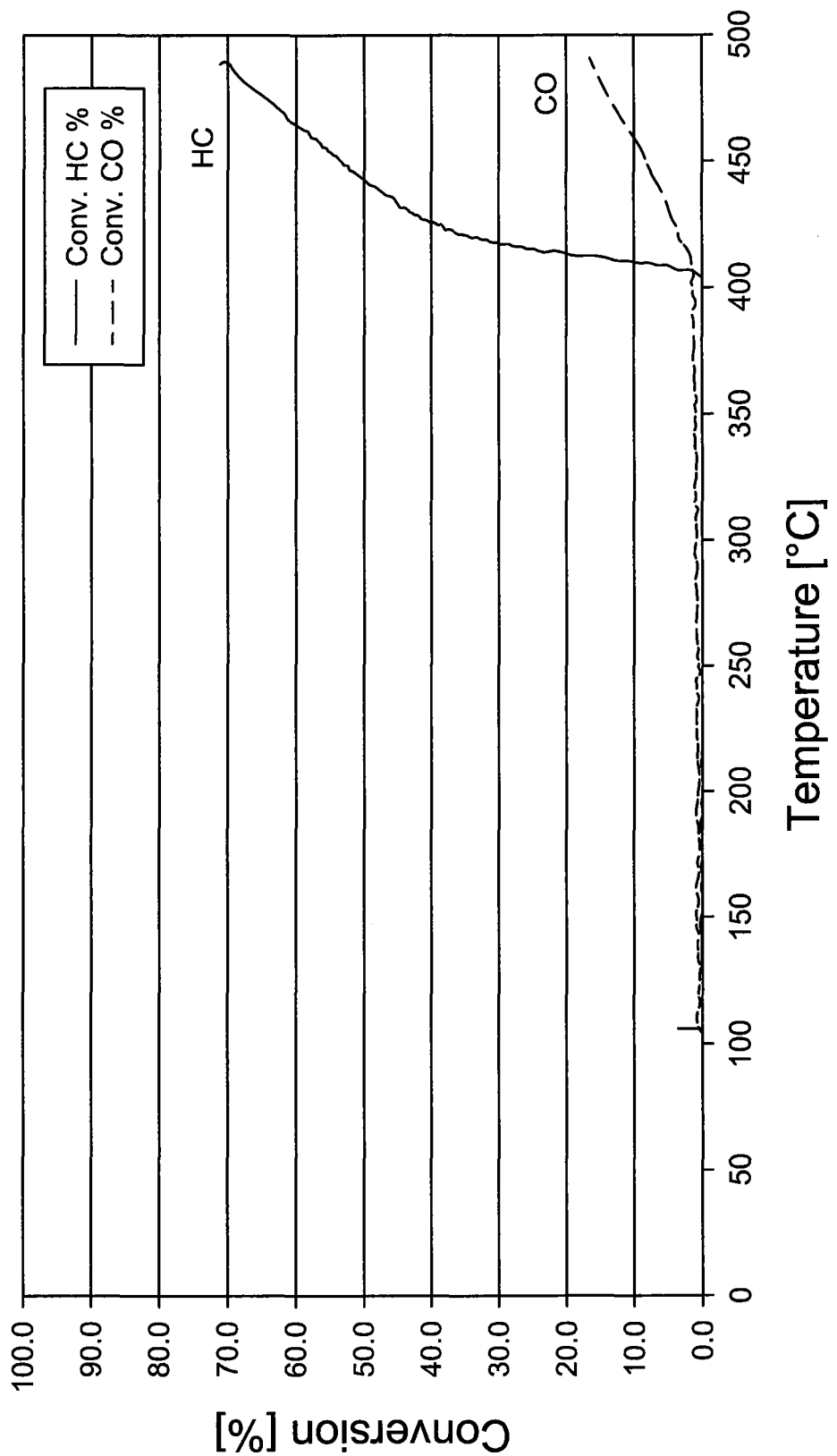
FIG. 2 is a graph showing the temperature-dependent conversion rates of hydrocarbons and carbon monoxide with an oxide ceramic fixed mixed oxide.

The temperature-dependent conversion rates of hydrocarbons and carbon monoxide are reproduced in FIG. 2.

EXAMPLE 3

0.018 g/l Pd—$Al_2O_3$—Ce—Ti—Cr Oxide in Ratio 40% $Al_2O_3$ and 60% CeTiCr 20-50-30 Oxide According to Example 1, a precipitation reagent is produced from Ce nitrate solution, titanium oxide sulfate solution, and Cr(III) nitrate solution. A commercial gamma $Al_2O_3$ is suspended in water and set to pH 8 to 9 with $NH_3$ solution. The Ce—Ti—Cr solution is now dripped slowly while controlling the pH value (>7). The Ce—Ti—Cr oxide precipitated onto the $Al_2O_3$ is filtered, washed sulfate free, dried, and heated. Then the powder is ground to form a coatable washcoat slurry. At a pH value of 4, according to the solid content of the wash-coat suspension, a Pd nitrate solution is dripped, so that a precious metal load of 0.018 g/l (0.5 g/ft$^3$) Pd is produced. For testing the catalytic activity, metal honeycombs are coated with a 200 g/l coating quantity and tested in a synthesis gas apparatus.

Figure 3:
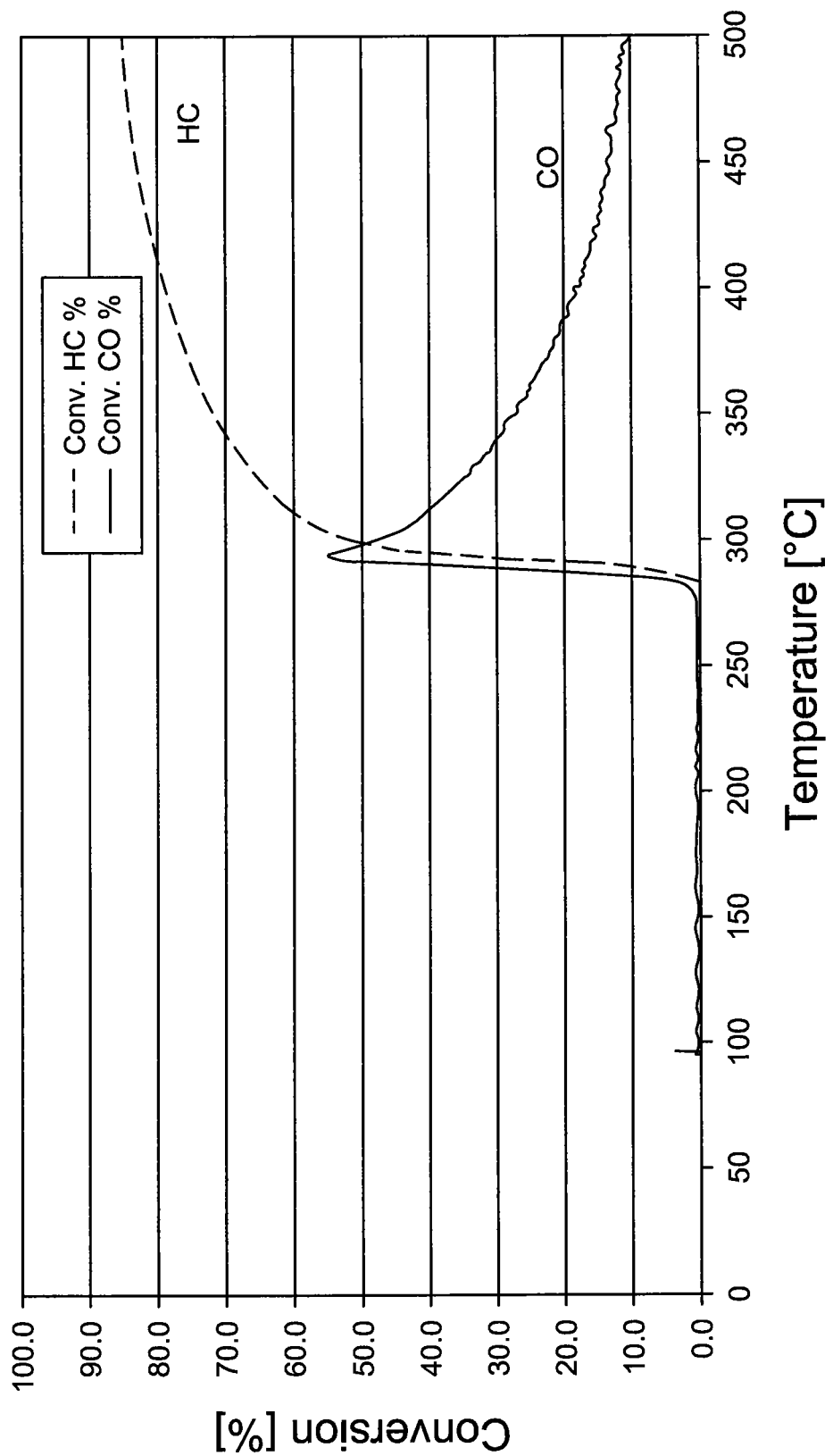
FIG. 3 is a graph showing the conversion rate of hydrocarbons and carbon monoxide with a mixed oxide catalyst doped with palladium.

The temperature-dependent conversion rates of hydrocarbons and carbon monoxide are reproduced in FIG. 3.

EXAMPLES 4-6 AND COMPARISON EXAMPLES 1-6

Additional ratios were carried out with reference to the production of different mixed-oxide powders, which were then tested in a tube reactor as dried and calcined powder in an exhaust gas containing CO, propane, and $O_2$ (5.5 vol. % CO, 8 vol. % $CO_2$, 5 vol. % $O_2$, 1 vol. % propane, and the remainder $N_2$). The results are to be found in Table 1. The conversion in percent with respect to hydrocarbons and CO relates to a temperature of 350° C. at a space velocity of 150,000 m$^3$/m$^3$·hr.

The production of a mixed oxide having a ratio of Ce 60-Ti 20-Cr 20 (Example 4) leads to comparable results in terms of activity with respect to hydrocarbon oxidation and also selectivity in terms of HC conversion relative to CO conversion, as well as for a mixed oxide in the ratio Ce 70-Ti 20-Cr 10 (Example 5). In comparison with this powder, the already described formulation having Ce 20-Ti 50-Cr 30 (Example 6) stands out with a particularly high oxidation activity for hydrocarbons.

A mixed oxide based on CeTi (Comparison Example 1) shows, in contrast, no hydrocarbon oxidation. A mixed oxide based on CeCr (Comparison Example 2) shows a moderate hydrocarbon oxidation activity with a poor selectivity with respect to hydrocarbon oxidation. A mixed oxide based on TiCr (Comparison Example 3) does show good selectivity, but the basic activity with respect to hydrocarbon oxidation is significantly reduced relative to a CeTiCr formulation. If the individual components Ce, Ti, and Cr are used separately as oxidation catalysts (Comparison Examples 4, 5 and 6)), then only Ce shows oxidation activity at a low level and equally for hydrocarbons and for CO. Ti is very slightly active relative to CO oxidation, and Cr is only slightly active relative to hydrocarbon oxidation.

TABLE 1

|  | Ce | Ti | Cr | HC Conversion | CO Conversion |
|---|---|---|---|---|---|
| Example 4 | 60 | 20 | 20 | 55 | 17 |
| Example 5 | 70 | 20 | 10 | 48 | 17 |
| Example 6 | 20 | 50 | 30 | 75 | 18 |
| Comparison Example 1 | 29 | 71 | 0 | 0 | 5 |
| Comparison Example 2 | 40 | 0 | 60 | 32 | 20 |
| Comparison Example 3 | 0 | 63 | 37 | 32 | 2 |
| Comparison Example 4 | 100 | 0 | 0 | 22 | 22 |
| Comparison Example 5 | 0 | 100 | 0 | 0 | 8 |
| Comparison Example 6 | 0 | 0 | 100 | 8 | 0 |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A catalyst for selective oxidation of hydrocarbon relative to carbon monoxide, wherein the catalyst is a mixed oxide based on the metals cerium, titanium, and chromium, and wherein the catalyst comprises a precious metal in an amount of 0.005 to 0.5 wt % based on a total weight of the mixed oxide.

2. The catalyst according to claim 1, wherein the mixed oxide is fixed to a molded body as a coating.

* * * * *